United States Patent
Nishikawa et al.

(10) Patent No.: US 6,983,906 B2
(45) Date of Patent: Jan. 10, 2006

(54) MASTER GEAR FOR SPINNING REEL

(75) Inventors: Tomohiro Nishikawa, Osaka (JP);
Hirokazu Hiraoka, Sakai (JP);
Yasuhiro Hitomi, Hashimoto (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/822,811

(22) Filed: Apr. 13, 2004

(65) Prior Publication Data
US 2004/0227028 A1 Nov. 18, 2004

(30) Foreign Application Priority Data
May 13, 2003 (JP) ............................. 2003-134901
Aug. 6, 2003 (JP) ............................. 2003-287256

(51) Int. Cl.
*A01K 89/01* (2006.01)

(52) U.S. Cl. ........................................ 242/282; 74/545

(58) Field of Classification Search ........ 242/282–284; 74/545
See application file for complete search history.

(56) References Cited

U.S. PATENT DOCUMENTS 5,690,289 A * 11/1997 Takeuchi et al. ............. 242/282
6,176,446 B1 * 1/2001 Sato ........................... 242/319

FOREIGN PATENT DOCUMENTS

JP 2000-83531 A 3/2000

* cited by examiner

*Primary Examiner*—Emmanuel M Marcelo
(74) *Attorney, Agent, or Firm*—Shinjyu Global IP Counselors, LLP

(57) ABSTRACT

A master gear includes a shaft made of an aluminum alloy, a gear portion, and an annular member made of stainless steel alloy. The shaft is screwed onto a handle shaft, a gear portion that is integrally formed on the outer periphery of the shaft. The shaft is supported by the reel unit at rotational support portions via bearings and has female threaded portions on its ends such that the handle is screwed to one of the female threaded portions. The gear portion is arranged on an outer periphery of the shaft portion between the rotational support portions, and meshes with a pinion gear. The annular portion is mounted to the outer periphery of the shaft such that at least part of the annular member is disposed not between the rotational support portions. With this structure, it is easy to remove bearings from a master gear of a spinning reel.

24 Claims, 13 Drawing Sheets

MASTER GEAR FOR SPINNING REEL

BACKGROUND OF THE INVENTION

Field of the Invention

The present invention generally relates to a master gear for a spinning reel. More specifically, the present invention relates to a master gear that is rotatively supported by a reel unit of a spinning reel, and which serves to transmit the rotation of a handle to a rotor via a pinion gear.

A spinning reel generally includes a reel unit that is mounted on a fishing rod, a rotor rotatively supported by the reel unit, and a spool that is arranged on the front of the rotor and on the outer periphery of which fishing line is wound. The rotor rotates unitarily with a pinion gear that is arranged on an outer peripheral side of a spool shaft. The spool is reciprocally moved forward and backward by an oscillating mechanism that includes an intermediate gear that meshes with the pinion gear. The pinion gear meshes with a master gear that includes a shaft that is perpendicular to the pinion gear, and rotates by the rotation of the handle. The outer peripheries of both ends of the master gear shaft are rotatively mounted on the reel unit by means of bearings and the like. The handle is mounted on the master gear shaft and a gear portion is arranged on the outer periphery of the master gear shaft. A handle which is screwed onto the master gear shaft is known to be used with this type of spinning reel (see, for example, Japanese Patent Application Publication No. 2000-83531).

In the aforementioned conventional configuration, the handle is mounted on a master gear shaft that is made of a lightweight metal. In order to reduce the weight of this type of master gear shaft, it has been considered to form the master gear shaft from lightweight metals such as, for example, an aluminum alloy, a magnesium alloy, or the like. However, when the master gear shaft is formed from a lightweight metal, it will generally be difficult for the master gear shaft to maintain a high degree of strength. Because of this, when the master gear shaft is mounted on the handle, there will be times in which the front end of the handle is pushed onto the master gear shaft and the end portion of the master gear shaft will buckle. When the end portion of the master gear shaft buckles, the end portion of the master gear shaft will be distended in the radially outward direction. If the end portion of the master gear shaft is distended in the radially outward direction, it will be difficult for the bearings to be removed.

In view of the above, it will be apparent to those skilled in the art from this disclosure that there exists a need for an improved master gear for spinning reel that overcomes the above described problems. This invention addresses this need in the art as well as other needs, which will become apparent to those skilled in the art from this disclosure.

SUMMARY OF THE INVENTION

An object of the present invention is to provide a spinning reel from a master gear of which it easier to remove the bearings.

A master gear for a spinning reel according to the first aspect of the present invention is for transmitting rotation of a screw-in type handle to a rotor via a pinion gear. The master gear is rotatively supported on a reel unit of the spinning reel, and includes a shaft made of a first lightweight metal, a gear portion, and an annular member that is made of a second metal that is harder than the first lightweight metal from which the shaft portion is made. The shaft portion is rotatively supported by the reel unit at a rotational support portion. The shaft portion has female threaded portions on its ends such that the handle is adapted to be screwed to one of the female threaded portions. The gear portion is arranged on an outer periphery of the shaft portion. The gear portion is adapted to mesh with the pinion gear. The annular member is mounted on the outer periphery of the shaft portion such that at least part of the annular member is disposed between the rotational support portion and an end of the shaft portion.

With this master gear, an annular member made of a hard metal is mounted on the outer periphery of end portions of a shaft portion made of a lightweight metal. Specifically, the hard second metal has a greater modulus of elasticity and greater breaking strength than those of the lightweight first metal. By mounting the annular member to the end portions of the shaft portion, distension of the end portions of the shaft portion in the radially outward direction can be prevented, even if the tip of the handle shaft is screwed onto the shaft portion. Thus, because it will be difficult for the end portions of the shaft portion to become distended in the radially outward direction, the bearings can be easily removed.

A master gear according to the second aspect of the present invention is the master gear of the first aspect of the present invention, in which the shaft portion is a tubular member in an inner periphery of which the handle is non-rotatably mounted. With this configuration, the shaft portion will be reliably mounted to the handle.

A master gear according to the third aspect of the present invention is the master gear of the first or second aspect of the present invention, in which the shaft portion is made of an aluminum alloy. With this configuration, the shaft portion can be manufactured more easily and the weight thereof can be reduced.

A master gear according to the fourth aspect of the present invention is the master gear of the first or second aspect of the present invention, in which the shaft portion is made of a magnesium alloy. With this configuration, the shaft portion can be further reduced in weight.

A master gear according to the fifth aspect of the present invention is the master gear of any of the first through fourth aspects, in which the annular member is made of a stainless steel alloy. With this configuration, distension in the radially outward direction of the end portions of the shaft portion can be reliably restricted by forming the annular member from a stainless steel alloy that is a metal whose modulus of elasticity is greater than that of the metal from which the shaft portion is made.

A master gear according to the sixth aspect of the present invention is the master gear of any of the first through fifth aspects, in which a liquid or a gel-type of filler made of an insulating material is filled between the shaft portion and the annular member. With this configuration, galvanic corrosion between the shaft portion which is made of, for example, a magnesium alloy and the annular member which is made of, for example, a stainless steel alloy can be prevented. In addition, the installation and attachment of the annular member will be made easier when the filler is an adhesive.

A master gear according to the seventh aspect of the present invention is the master gear of any of the first through sixth aspects, in which the gear portion is integrally formed with the shaft portion as a one-piece unitary unit. With this configuration, the strength of the gear portion and the shaft portion can be maintained at a high level.

A master gear according to the eighth aspect of the present invention is the master gear of any of the first through sixth aspects, in which the gear portion is formed separately from the shaft portion. With this configuration, the formation of the gear portion can be made easier, and the gear portion and the shaft portion can be formed from different materials.

A master gear according to the ninth aspect of the present invention is the master gear of any of the first through eighth aspects, in which the annular member includes a tubular portion disposed on the outer periphery of the shaft portion extending toward the gear portion, and an inner flange portion that is bent inward from an axial end of the tubular portion. With this configuration, the formation of the annular member can be made easier because, for example, a sheet-metal tubular member can be formed into the inner flange portion by press working.

A master gear according to the tenth aspect of the present invention is the master gear of the ninth aspect of the present invention, in which the tubular portion is mounted on the outer periphery of the shaft portion such that at least part of the tubular portion is between the rotational support portion and the end of the shaft portion. With this configuration, when for example a bearings is arranged on the reel unit at the rotational support portion, the shaft portion can be reliably supported because the tubular portions is mounted on the outer periphery of the shaft portion such that the tubular portion is mounted to the part of the shaft portion that is between the bearing and the end of the shaft portion, and the part of the shaft portion that is not between the bearing and the end portion is supported by the bearing.

A master gear according to the eleventh aspect of the present invention is the master gear of the ninth or tenth aspect of the present invention, in which the tubular portion is mounted on the outer periphery of the shaft portion extending through the rotational support portion. With this configuration, when for example the bearing is arranged on the reel unit at the rotational support portion, the tubular portion mounted on the outer periphery of the shaft portion is supported by the bearing. Here, the tubular portion is arranged through the entire outer circumference of the end portion of the shaft portion, and thus distension of the end portion of the shaft portion in the radially outward direction can be reliably restricted.

A master gear according to the twelfth aspect of the present invention is the master gear of the eleventh aspect of the present invention, in which the annular member further includes an outer flange portion which is bent outward from a gear portion side axial end of the tubular portion. With this configuration, when for example the bearings are arranged on the reel unit at the rotational support portions, by forming the outer flange portions to be engagable with the end surfaces of the bearings on the gear portion side thereof, the outer flange portions will engage with the bearings even if for example the adhesive between the annular member and the shaft portion peels off. Accordingly, the annular member can be prevented from falling off the shaft portion.

According to the present invention, the distension of the end portion of the master gear shaft for a spinning reel can be held in check by mounting an annular portion made of a hard metal on the outer periphery of the end portion of the shaft made of a lightweight metal. Thus, the bearings can be easily removed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
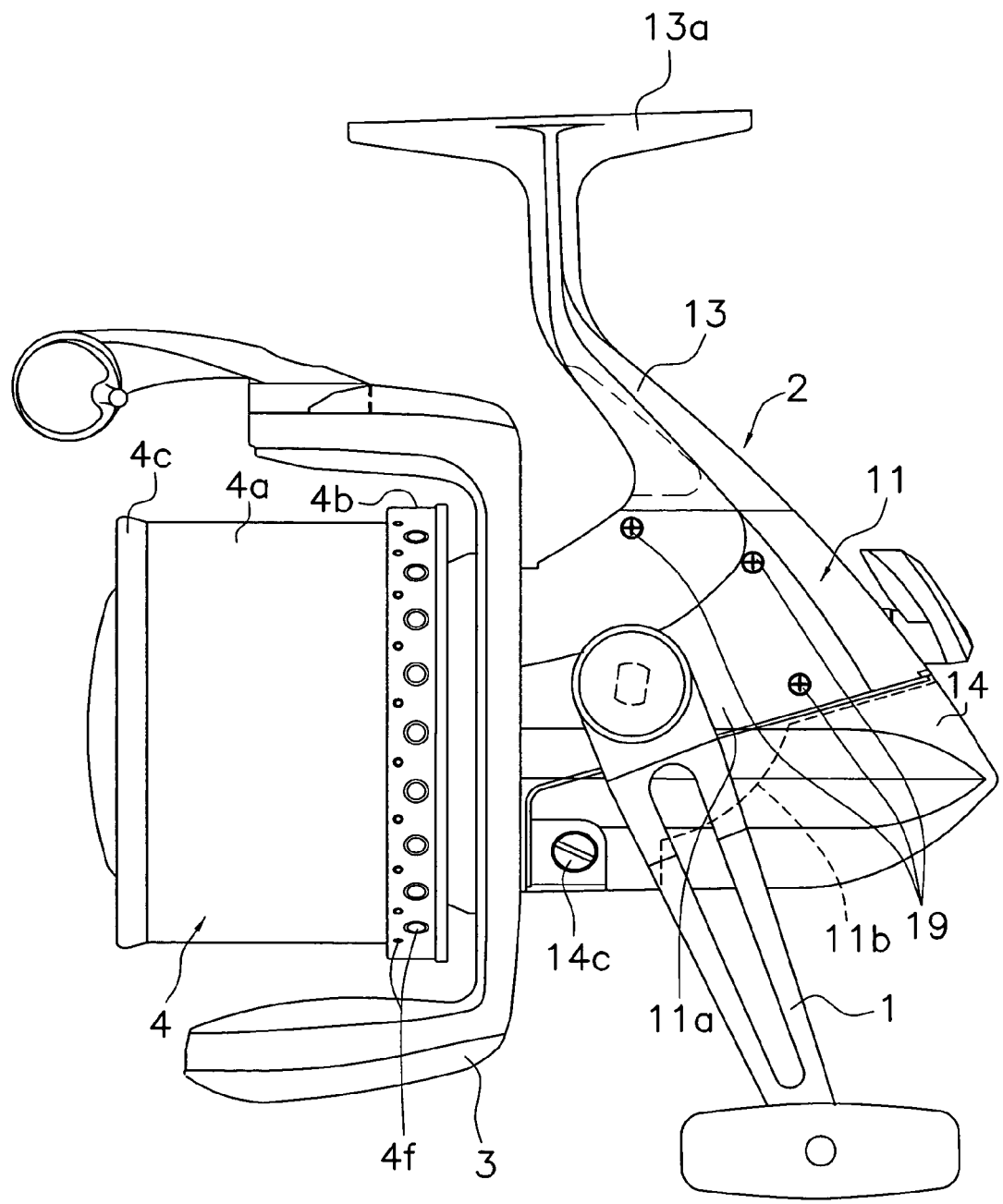
FIG. 1 is a lateral view of a spinning reel in accordance with an embodiment of the present invention.
Figure 2:
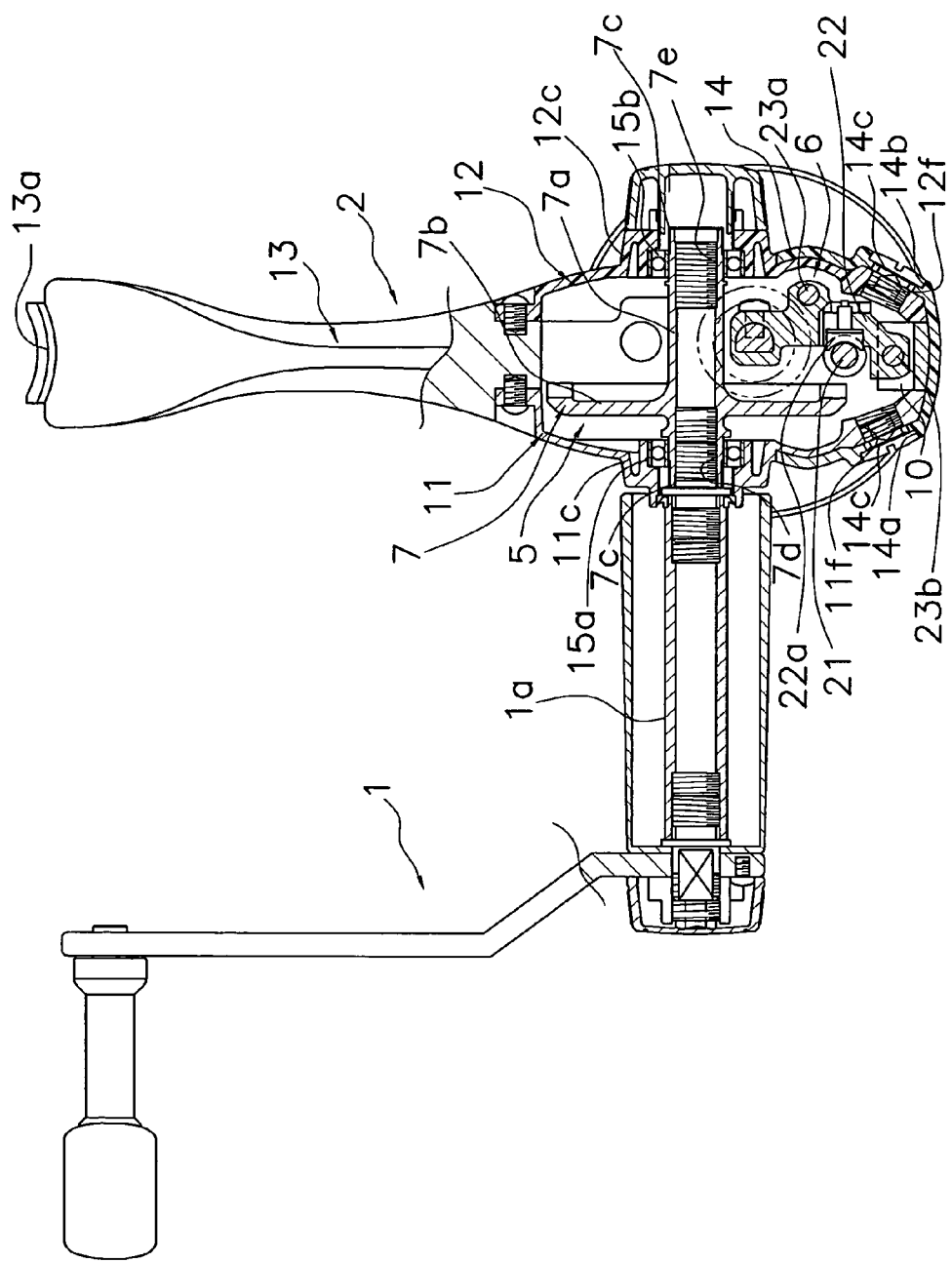
FIG. 2 is a bottom cross-sectional view of the spinning reel in accordance with the embodiment of the present invention.
Figure 3:
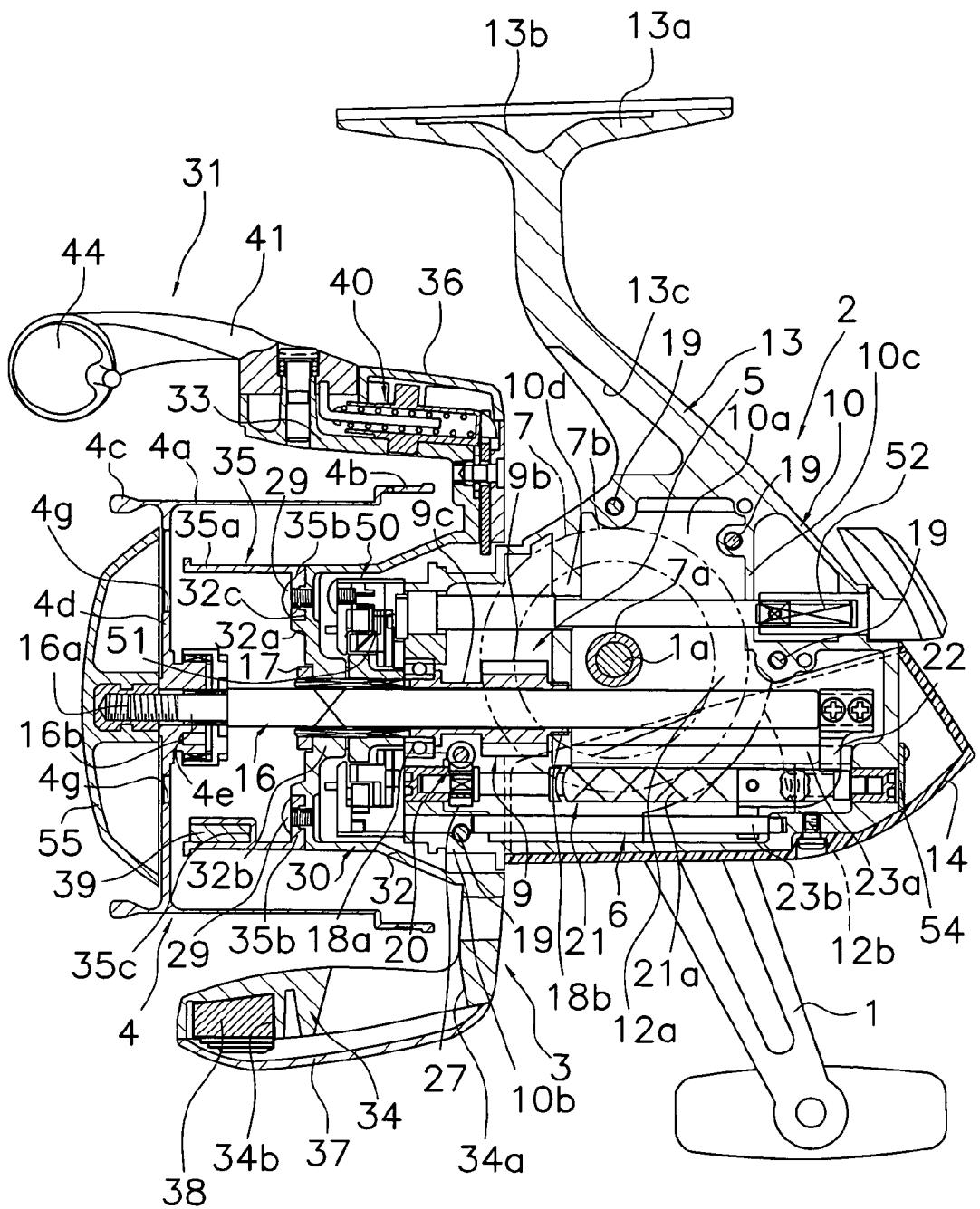
FIG. 3 is a lateral cross-sectional view of the spinning reel in accordance with the embodiment of the present invention.

As shown in FIGS. 1 to 3, a spinning reel according to one embodiment of the present invention primarily includes a reel unit 2 having a handle 1 and mounted to a fishing rod, a rotor 3 rotatively mounted on the front portion of the reel unit 2, and a spool 4 that is mounted on the front portion of the rotor 3 and which moves forward and rearward. The spinning reel additionally includes a rotor drive mechanism 5 for driving the rotor 3 to rotate in cooperation with rotation of the handle 1, and an oscillating mechanism 6 for moving the spool 4 back and forth in cooperation with rotation of the rotor 3.

Reel Unit

The reel unit 2 accommodates the rotor drive mechanism 5 and the oscillating mechanism 6 in the interior thereof. The reel unit 2 includes, as shown in FIGS. 1 to 4, a housing unit 10 having an opening in both sides thereof, first and second lids 11 and 12 for closing both sides of the housing unit 10, a rod attachment portion 13 formed integrally with the housing unit 10, and a cover member 14 for covering the housing unit 10 and both of the lids 11 and 12 from the rear thereof.

The housing unit 10 is a member that has an anodic oxide film formed on the surface thereof, and is made of, for example, a magnesium alloy which is lightweight and capable of maintaining specific strength, and is a frame-shaped member in which both surfaces are opened to form an accommodation space 10a that serves to accommodate and support the rotor drive mechanism 5 and the oscillating mechanism 6. The housing unit 10 has a substantially uniform depth dimension (the dimension along the orthogonal direction to the plane of FIG. 3). A disk-shaped mechanism support portion 10b is formed in the front surface of the housing unit 10, and has a one-way clutch (later described), a pinion gear (later described), and the like for an anti-reverse mechanism mounted thereto. An operation support portion 10c for supporting a switching operation unit (later described) of the anti-reverse mechanism is formed in the rear portion thereof. An intermediate support portion 10d for supporting the pinion gear and the switching operation unit extends downward from the upper portion at the rear of the mechanism support portion 10b.

A first lid 11 is a member made of an aluminum alloy that can maintain high specific strength and corrosion resistance, and is formed so as to cover one side of the housing unit 10. The first lid 11 is, as shown in FIG. 2, arranged adjacent to a master gear 7. As is clear from FIGS. 1 and 4, the first lid 11 includes a first cover portion 1a for covering the master gear 7 that rotates according to rotation of the handle 1 in the opening of one side of the housing unit 10, and a second cut-out 11b that exposes an opening rearward from the first cover portion 11a (rearward from the portion indicated by the dashed line in FIG. 1). The second cut-out 11b is formed to minimize an overlap between the first lid 11 and the cover member 14 to achieve weight reduction.

Figure 4:
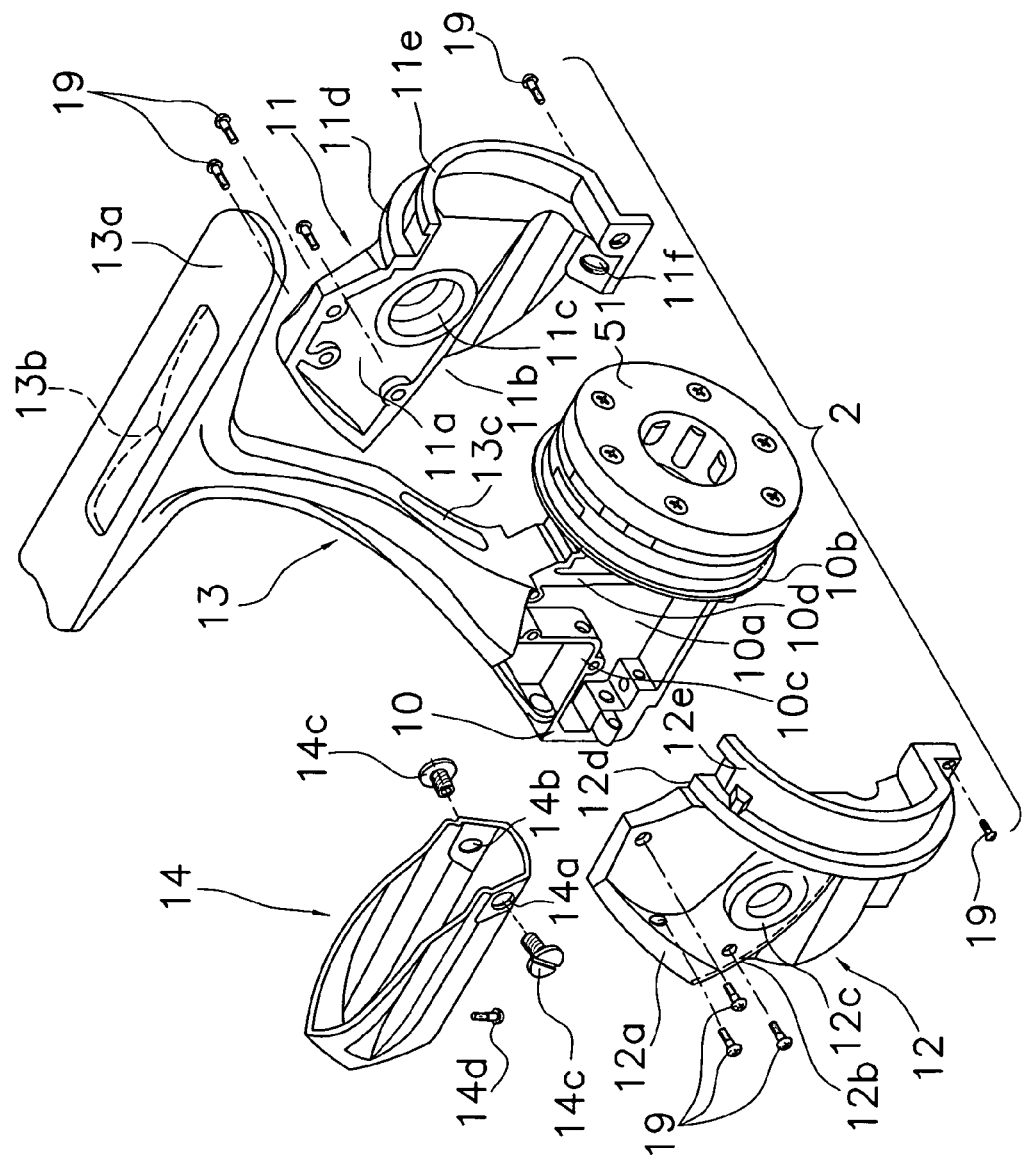
FIG. 4 is an exploded oblique view of the reel unit of the spinning reel in accordance with the embodiment of the present invention.

As shown in FIGS. 2 and 4, a first boss portion 11c that supports a first rotational support portion 7a1 of the master gear 7 on the back side of the master gear 7 is formed on the first lid 11, and protrudes outward on the approximate central portion of the wall surface of the first cover portion 11a. An approximately semi-circular first flange portion 11d that constitutes a disk-shaped portion that enters inside the rotor 3 is formed on the front portion of the first lid 11. An approximately semi-circular arc-shaped first mechanism accommodating cover 11e that is disposed on the rear surface of the mechanism support portion 10b and approximately flush with the outer peripheral surface of the mechanism support portion 10b is formed on the front portion of the first flange portion 11d. Since the master gear 7 is adjacently arranged to the first lid 11, a large force tends to act on the first boss portion 11c when the master gear 7 receives a large load. In view of this, the first lid 11 is made of metal in order to keep the specific strength high. In a lower front portion of the first lid 11, a first screw hole 11f is formed for fitting the cover member 14 and for performing maintenance such as draining water during washing or filling with grease.

The second lid 12 has a shape that is substantially symmetrical and has a mirror image relationship with the first lid 11. Provided therewith are a second cover portion 12a, a second cut-out 12b, a second boss portion 12c, a second flange portion 12d having substantially a mirror image relationship with the first flange portion 11d, and a mechanism accommodating cover 12e. A second screw hole 12f (see FIG. 2) is also formed at a location opposing the first screw hole 11f. The first and second flange portions 11d and 12d are formed so as to constitute a circular shape that accommodates the outer peripheral surface of the rear of the mechanism supporting portion 10b of the housing unit 10. This circular portion is configured so as to be inserted in the rear of the rotor 3 at a slight gap. The second lid 12 is arranged relatively far from the master gear 7, so a large force is not likely to act on the second boss portion 12c. Accordingly, in order to achieve weight reduction, the second lid 12 is made of a synthetic resin such as nylon 66. The second boss portion 12c is formed to protrude outward on the approximate central portion of the wall surface of the second lid 12 and to oppose the first boss portion 11c, while serving to support a second rotation support portion 7a2 of the master gear 7.

It should be noted that both the first lid 11 and the second lid 12 are fixedly coupled to the housing unit 10 by, for example, fixing screws 19 such as round head screws. However, various modifications may be considered for the method of fixing the first lid 11 and the second lid 12. For example, the first lid 11 and the second lid 12 may be coupled by screws passing from one of the lids to the other lid through the housing unit 10.

The rod attachment portion 13 is a T-shaped member extending upward from the housing unit 10, and a reel foot 13a formed on the tip of the rod attachment portion 13 and extending longitudinally is mountable onto a reel seat (not shown) of a fishing rod. The rod attachment portion 13 is formed so that thickness-reducing portions 13b and 13c are formed in its upper face and front face to attain weight reduction and uniform wall thickness.

The cover member 14 is curved so as to cover from the rear the sides and the bottom of the housing unit 10 onto which the first and second lids 11 and 12 are mounted. The cover member 14 is provided in order to close the first and second cut-outs 11b and 12b formed at the rear of the first and second lids 11 and 12, and to prevent the side and the rear face of the reel unit 2 including its rear end corner from being scratched. The cover member 14 is made of a relatively hard synthetic resin such as ABS resin, and its surface is subjected to metal plating. In the cover member 14, stepped screw-fitting holes 14a and 14b are formed at the locations corresponding to the first and second screw holes 11e and 12e. A screw member 14c screwed through the first and second screw holes 11f and 12f is screwed through these screw-fitting holes 14a and 14b so that the cover member 14 is fastened to the first lid 11 and second lid 12, and that the cover member 14 can be opened for maintenance. The cover member 14 is attached to the lower rear surface of the housing unit 10 at the rear end of the lower surface of the cover member 14. It is also fixedly coupled to the housing unit 10 by a screw member 14d.

With a reel unit 2 thus configured, the first lid 11, which is arranged adjacent to the master gear 7 and is thus likely to be acted on by a relatively large force, can be made to have a high specific strength, and yet weight reduction is made possible because the first lid 11 is made of an aluminum alloy, which is lightweight and has a high specific strength. Moreover, because the second lid 12, which is far from the master gear 7 and is thus unlikely to be acted on by such a large force, is made from a synthetic resin, weight reduction is achieved. Furthermore, since the housing unit 10 is made of a magnesium alloy, the specific strength of the reel unit 2 as a whole is kept high and weight reduction is attained.

Rotor Driver Mechanism

The rotor drive mechanism 5 includes the master gear 7 on which a handle shaft 1a of the handle 1 is screwed and fixedly coupled, and the pinion gear 9 that meshes with the master gear 7.

Figure 10:
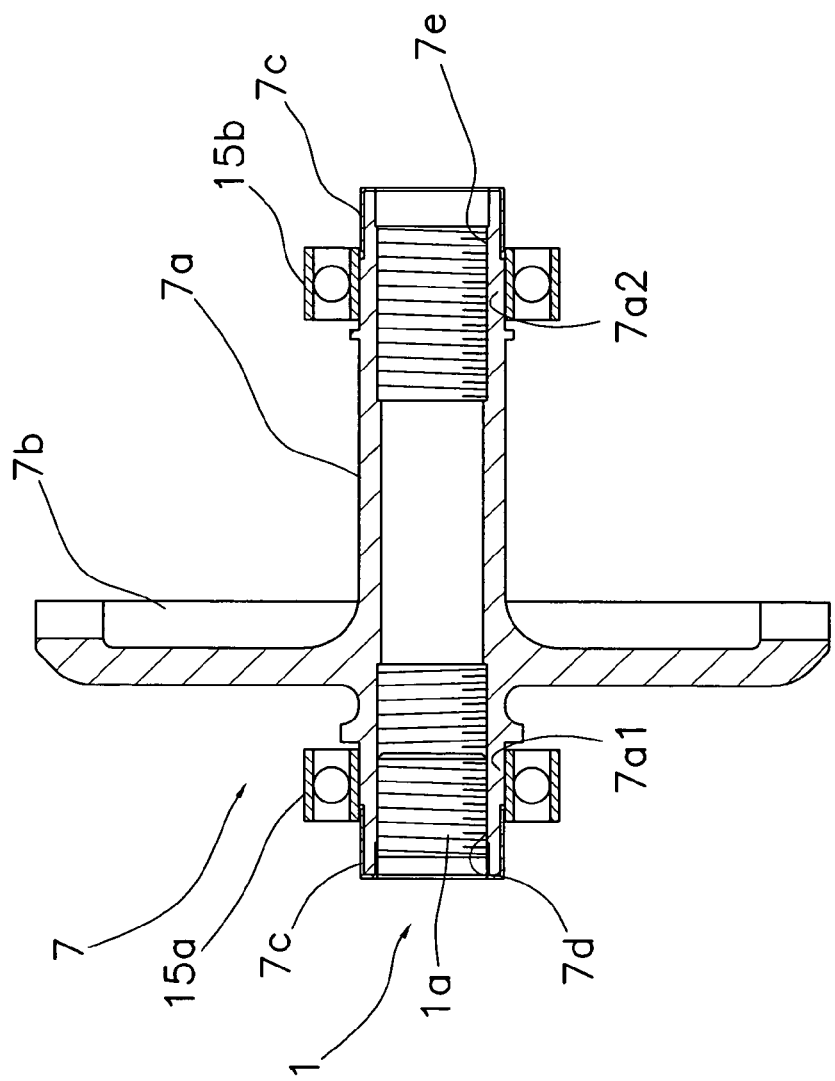
FIG. 10 is a cross-sectional view of a master gear of the spinning reel in accordance with the embodiment of the present invention.

As shown in an enlarged view in FIG. 10, the master gear 7 includes a shaft 7a that is made of an aluminum alloy (an example of first lightweight metal) and into which the handle shaft 1a is screwed, a gear portion 7b that is integrally formed on the outer periphery of the shaft 7a as a one-piece unitary unit and meshes with the pinion gear 9, and annular portions 7c that are made of a stainless steel alloy (an example of second metal) and mounted on the outer periphery of both end portions of the shaft 7a.

As shown in FIG. 2, the shaft 7a is a tubular member that is rotatively mounted to the reel unit 2 by bearings 15a and 15b that are mounted onto the first and second boss portions 11c and 12c. The first and second boss portions 11c and 12c are formed in the first lid 11 and the second lid 12 of the reel unit 2. Female threaded portions 7d, 7e into which the handle shaft 1a can be screwed are respectively formed in the inner peripheral portions of both ends of the shaft 7a. The female threaded portions 7d, 7e are screws that are tightened when the handle 1 is rotated in a line reel-in direction. Therefore, the female threaded portion 7d on the left side of FIG. 2 is a left-hand screw, whereas the female threaded portion 7e on the right side of FIG. 2 is a right-hand screw. It should be noted that the handle 1 can be mounted to either end of the shaft 7a, either to the left position as shown in FIGS. 1 and 2 or the right position as shown in FIG. 3. However, because the female threaded portions 7d, 7e have different tightening directions, specialized handle shafts 1a are used to attach the handle shaft 1a on the left or right sides. Note that FIG. 2 shows the handle shaft 1a for the left handle.

As shown in FIG. 10, the gear portion 7b is a disk-shaped member that is made of an aluminum alloy and integrally formed on the outer periphery of the shaft 7a on the inner side of the bearings 15a, 15b of the shaft 7a, and is a face gear that meshes with the pinion gear 9.

As shown in FIG. 10, the annular portion 7c is an annular member that is made of a stainless steel alloy and is mounted on the outer peripheries of both ends of the shaft 7a on the outer sides of the bearings 15a, 15b. Clearly, it is known to the ordinarily skilled in the art that stainless steel alloy, from which the annular portion 7c is made, has a greater modulus of elasticity than that of aluminum, from which the shaft 7a is made. Furthermore, for the purpose of comparing the moduli of elasticity, any conventionally known modulus of elasticity such as the Young modulus may be utilized. It is also clear to the ordinarily skilled in the art that the breaking strength of the stainless steel alloy is also greater than that of the aluminum.

Figure 11:
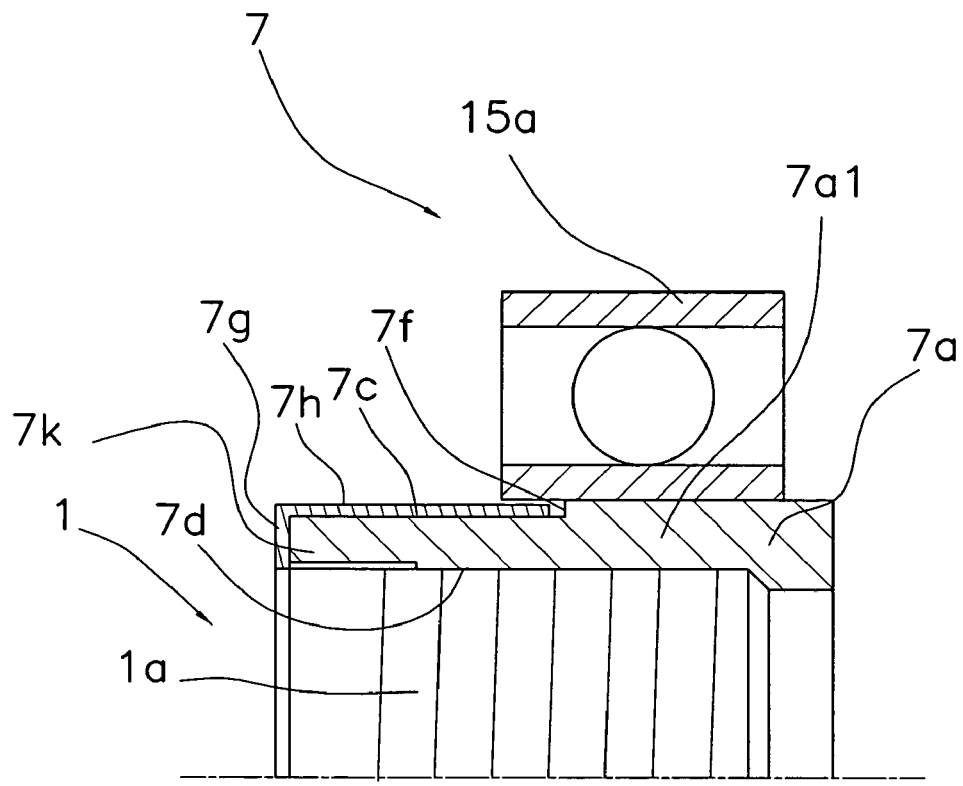
FIG. 11 is an enlarged cross-sectional view of an end portion of the master gear of the spinning reel in accordance with the embodiment of the present invention.

As shown in an enlarged view in FIG. 11, the annular portions 7c each include an inner flange portion 7g that is bent inward so as to contact with the end portion of the shaft 7a in the axial direction, and a tubular portion 7h on the outer peripheral portion of the end portion 7k of the shaft 7a that extends from the inner flange portion 7g toward the gear portion 7b. As shown in FIGS. 10 and 11, at least part of the tubular portion 7h is disposed between the rotation support portions 7a1 and the end portion 7k of the shaft 7a. A through hole through which the handle shaft 1a can pass through is formed in the inner peripheral portion of the inner flange portion 7g. The outer peripheral portion of the end portion of the shaft 7a is formed such that the diameter thereof is smaller than the diameter of other portions thereof by a length slightly greater than the thickness of the tubular portion 7h, and includes a step portion 7f. Because of this, the outer peripheral surface of the tubular portion 7h will not be in contact with the inner peripheral surfaces of the bearings 15a, 15b. In addition, the front end of the tubular portion 7h is not in contact with the step portion 7f of the shaft 7a, and thus compression and buckling of the annular portion 7c can be prevented. Note that a liquid or a gel-type adhesive (an example of the filler) composed of an insulating material (not shown in the figures) is placed between the annular portion 7c and the shaft 7a, thereby fixedly attaching the annular portion 7c to the shaft 7a.

The pinion gear 9 is a hollow tubular member, and its front portion passes through the rotor 3 and is mounted non-rotatably to the rotor 3. A spool shaft 16 is disposed so as to pass through the inner circumference of the pinion gear 9, such that the rotor 3 rotates around the spool shaft 16. A nut 17 is fitted to the front of the pinion gear 9, and the rotor 3 is fixedly coupled to the pinion gear 9 by the nut 17. The pinion gear 9 is supported rotatably by the respective bearings 18a (roller bearing) and 18b (bush) at its midportion and rear end portion with respect to the shaft axis in the housing unit 10 of the reel unit 2. The bearing 18a is fitted to the mechanism support portion 10b, and the bearing 18b is fitted to the intermediate support portion 10d. A ring-shaped cut-out 9c is formed in the gear portion 9b formed on the rear end side of the pinion gear 9. The ring-shaped cut-out 9c is provided in order to compactly house a later-described gear-down train 20. Rotor drive mechanisms are well-known components in the art, therefore, the structure and functions of the rotor drive mechanism 5 will not be described in further detail.

Oscillating Mechanism

The oscillating mechanism 6 includes, as shown in FIGS. 2 and 3, a gear-down train 20 that meshes with the pinion gear 9, a worm shaft 21 that rotates in cooperation with the gear-down train 20, a slider 22 that engages with the worm shaft 21 and moves back and forth, and two guide shafts 23a and 23b for guiding the slider 22 in the spool shaft 16 direction.

Figure 5:
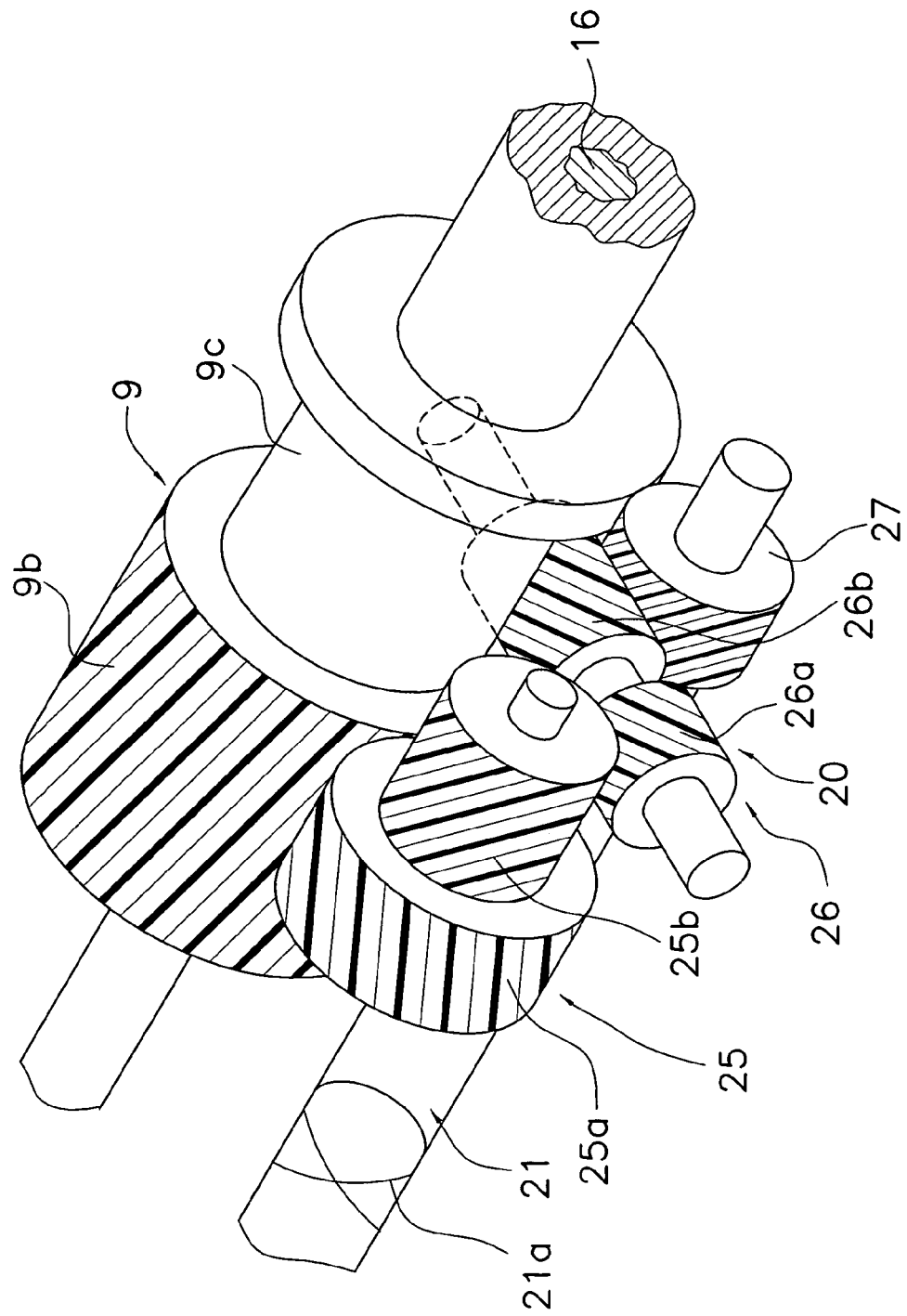
FIG. 5 is an oblique view of a gear-down train of the spinning reel in accordance with the embodiment of the present invention.

As shown in FIG. 5, the gear-down train 20 includes a stepped gear unit 25 having a large diameter gear 25a and a small diameter gear 25b that mesh with the pinion gear 9, a first intermediate gear shaft 26 including a first intermediate gear 26a that meshes with the small diameter gear 25b and a second intermediate gear 26b spaced apart from the first intermediate gear 26a, and a driven gear 27 that is fitted non-rotatably to the worm shaft 21 and meshes with the second intermediate gear 26b.

The stepped gear unit 25 rotates around an axis parallel to the pinion gear 9. The large diameter gear 25a is a screw gear that meshes with the pinion gear 9. The small diameter gear 25b, the first intermediate gear 26a, the second intermediate gear 26b, and the driven gear 27 are also screw gears. The intermediate shaft 26 rotates around an axis different from that of the stepped gear unit 25. The worm shaft 21, to which the driven gear 27 is fitted, rotates around an axis different from that of the intermediate shaft 26 and parallel to the pinion gear 9. The second intermediate gear 26b of the intermediate shaft 26 is disposed below the cut-out 9c of the pinion gear 9. As a consequence, the worm shaft 21 can be arranged closer to the pinion gear 9 than when a cut-out is not formed in the pinion gear 9, and thus the reel as a whole can be made compact. With the geardown train 20 thus configured, the rotational speed of the pinion gear 9 is greatly reduced when transmitted to the worm shaft 21.

The worm shaft 21 is a member that has intersecting helical grooves 21a formed thereon, and is disposed parallel to the spool shaft 16. The worm shaft 21 is rotatively mounted on the front and rear ends of the housing unit 10 via bearings made of, for example, a synthetic resin. The worm shaft 21 is inserted from the rear of the housing unit 10, and is retained by a fixing plate 54 screwed to the rear surface of the housing unit 10.

As shown in FIG. 2, the slider 22 has an engaging member 22a that engages with the grooves 21a of the worm shaft 21. The slider 22 is coupled to the rear end of the spool shaft 16 non-rotatably and axially immovably. With the tip of the engaging member 22a engaging with the grooves 21a, the slider 22 moves back and forth in the spool shaft direction in accordance with rotation of the worm shaft 21, and moves the spool shaft 16 back and forth in cooperation with rotation of the handle 1.

The guide shafts 23a and 23b pass through the slider 22, and guide the slider 22 along the spool shaft 16. The guide shaft 23a is fixedly held at both ends by the rear end and the intermediate support portion 10d of the housing unit 10. The guide shaft 23a is mounted from the rear of the housing unit 10, and its rear end is retained by a fixing plate 54 that retains the worm shaft 21. The guide shaft 23b is fixedly held at both ends by the front and rear ends of the housing unit 10. The guide shaft 23b is inserted from the front of the housing unit 10. The front portion of the guide shaft 23b can come into contact with the fastening screw 19 that fastens the front portion of the first lid 11, so as to be retained by the fastening screw 19. Oscillating mechanisms are well-known components in the art, therefore, the structure and functions of the rotor drive mechanism 6 will not be described in further detail.

Rotor

The rotor 3 is a so-called bail-less type of rotor in which a fishing line guide portion is provided on only one of the rotor arms.

The rotor 3 includes, as shown in FIGS. 3 and 6 to 8, a rotor unit 30 rotatively mounted to the reel unit 2 via the pinion gear 9, and a fishing line guide portion 31 fitted pivotably onto the rotor unit 30.

The rotor unit 30 is made of, for example, a magnesium alloy on the surface of which an anodic oxide film is formed, and includes a cylindrical support portion 32 and first and second rotor arms 33 and 34 spaced from the support portion 32 and extending forward from respective opposing locations on the outer peripheral surfaces of the rear end of support portion 32.

The support portion 32 is a substantially cylindrical member that is tapered so that its diameter decreases from the rear end toward the front end and is then formed into a cylindrical shape. A front wall 32a is formed on the front portion of the support portion 32, and a boss portion 32b through which the front of the pinion gear 9 passes is formed in the central portion of the front wall 32a. The boss portion 32b is non-rotatably mounted to the front of the pinion gear 9. The nut 17 is screwed onto the front of the pinion gear 9 at the front of the front wall 32a, and the rotor 3 is fastened to the pinion gear 9 by the nut 17. A tubular-shaped line-entanglement prevention member 35 that prevents entanglement of fishing line with the spool shaft 16 is mounted at the front of the support portion 32.

A fishing line guide portion 31 is mounted on the tip of the first rotor arm 33 so as to be pivotable between a line-winding posture and a line-releasing posture. An interlocking mechanism 40 that interlocks with the pivoting of the fishing line guide portion 31 is mounted in the inner side of the first rotor arm 33. The radially outward periphery of the first rotor arm 33 is covered by a first cover member 36.

Like the first rotor arm 33, the second rotor arm 34 extends forward and its radially outward periphery is covered by a second cover member 37. The second rotor arm 34 is provided for the purpose of maintaining the rotational balance of the rotor 3. For this reason, the second rotor arm 34 is configured such that its center of gravity is tilted forward in order to bring the center of gravity of the second rotor arm 34 close to that of the first rotor arm 33 on which the fishing line guide portion 31 is mounted. In order to shift the center of gravity forward, an opening 34a is formed in the base end side of the second rotor arm 34, and a weight-accommodating portion 34b for mounting a weight member 38 is formed in the tip side of the second rotor arm 34. The weight member 38 is made of, for example, a tungsten alloy. Further, in order to tilt the center of gravity forward, the second rotor arm 34 extends forward at a length that is longer than that of the first rotor arm 33, as clearly seen from FIGS. 7 and 8.

Figure 6:
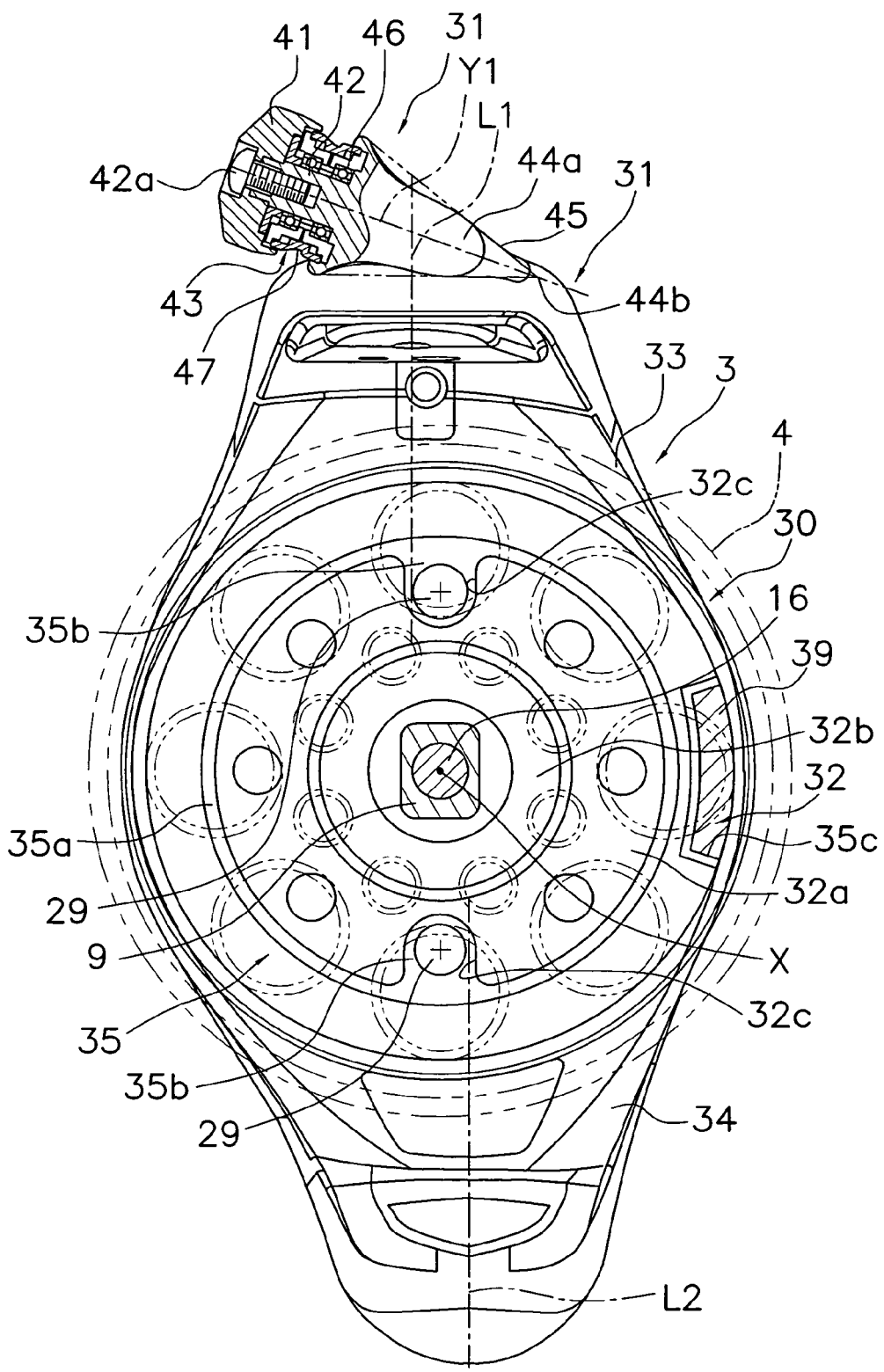
FIG. 6 is a front view of the rotor of the spinning reel in accordance with the embodiment of the present invention.
Figure 7:
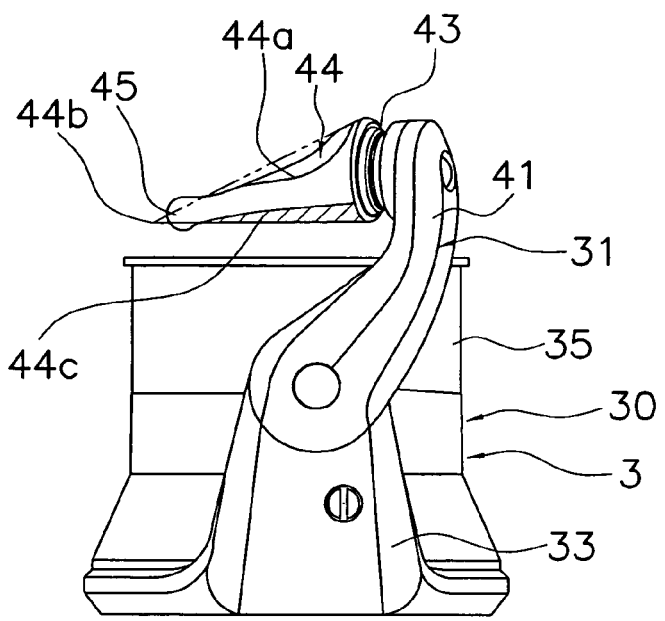
FIG. 7 is a right cross-sectional view of the rotor of the spinning reel in accordance with the embodiment of the present invention.
Figure 8:
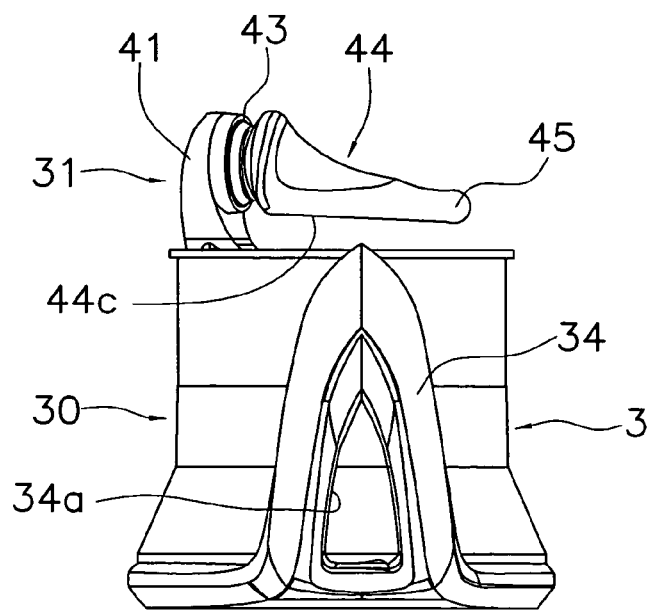
FIG. 8 is a left cross-sectional view of the rotor of the spinning reel in accordance with the embodiment of the present invention.
Figure 9:
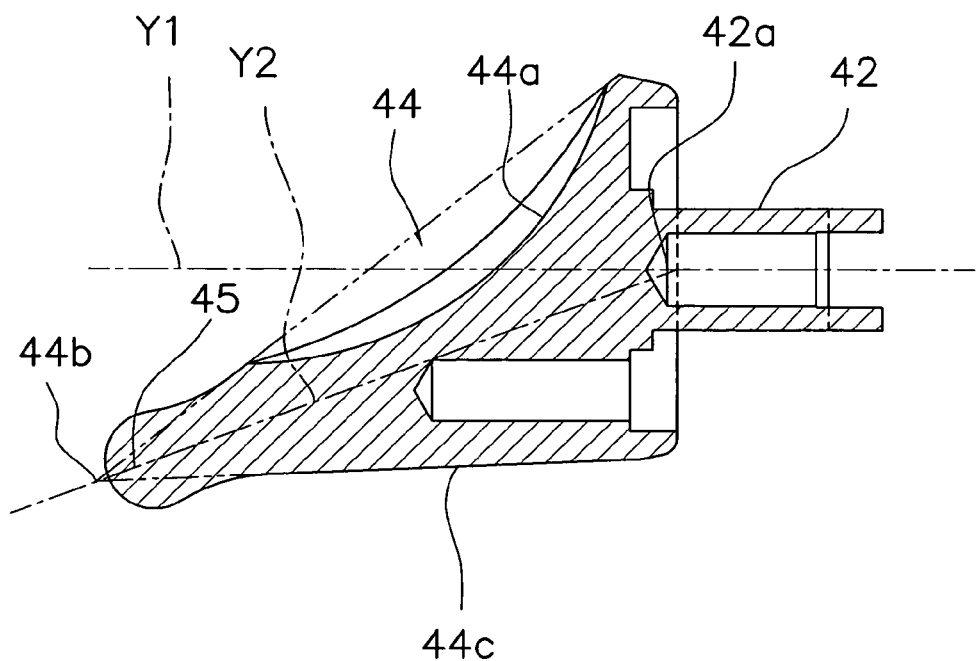
FIG. 9 is a cross-sectional view of the fixed shaft cover of the spinning reel in accordance with the embodiment of the present invention.

Here, as shown in FIG. 6, the two rotor arms 33 and 34 are formed such that a first line L1, which is drawn through the pivotal center of the fishing line guide part 31 of the first rotor arm 33, and a second line L2, which is drawn through the width-wise center of the second rotor arm 34 substantially parallel to the first line L1, are arranged so that they are spaced at the same distance from the rotational axis X of the rotor unit 30 on opposite sides. When the first rotor arm 33 and the second rotor arm 34 are arranged in this manner, the rotational balance can be maintained further desirably even if the fishing line guide portion 31 is severely tilted away from the rotational axis X (outward with respect to the first line L1 in FIG. 6).

The line-entanglement prevention member 35 includes a cylindrical entanglement-preventing portion 35a formed to be flush with the cylindrical portion of the support portion 32, and a pair of tongue-shaped attachment portions 35b provided on the rear end of the entanglement-preventing portion 35a and opposed to the center. The tip of the entanglement-preventing portion 35a has a larger diameter that of the rest of the entanglement-preventing portion 35a, thereby preventing the fishing line that has intruded into the interior of the spool 4 from entering the interior of the rotor 3. In addition, a weight accommodating portion 35c for accommodating a weight member 39 that corrects rotational balance is formed on the inner peripheral surface of the tip of the entanglement-preventing portion 35a. The weight member 39 is made of, for example, a tungsten alloy. Note that the weight accommodating portion 35c is depicted in FIG. 3 as if it is formed at a location near the second rotor arm 34 for the sake of clarity in illustration, but it is actually disposed, as shown in FIG. 6, at the mid position between the first rotor arm 33 and the second rotor arm 34 in the direction in which the fishing line guide portion 31 pivots. By disposing the weight accommodating portion 35c in this way, the rotational balance can be corrected by the weight member 39 which is disposed on the opposite side of the fishing line guide portion 31 with respect to the rotational axis X, even if the fishing line guide portion 31 is tilted further away from the rotational axis X than the first line L1.

The line-entanglement prevention member 35 is fastened to the front wall 32a by two screw members 29, 29 screwed from the front of the attachment portions 35b. The front face of the front wall 32a is formed to be a flat surface in a ring-like shape when the line-entanglement prevention member 35 is fitted, and even with the attachment portions 35b. In order to form such a flat surface with the attachment portions 35b on the front face of the front wall 32a, recessed portions 32c in which the tongue-like-shaped attachment portions 35b are fitted are formed in the front wall 32a. Accordingly, the structure is configured so that even when foreign matter enters from the spool 4 side and attaches thereto, the foreign matter can easily be removed by detaching the spool 4 and, for example, wiping it off.

The fishing line guide portion 31 is arranged so that fishing line is smoothly guided from the fishing rod to the spool 4 and wound around the spool 4. Thus, as shown in FIG. 6, the fishing line guide portion 31 tilts severely outward (left to right in FIG. 6) from the rotational axis X of the rotor 3 such that fishing line will be easily guided onto the outer peripheral surface of a bobbin 4a (described below) of the spool 4. The fishing line guide portion 31 includes, as shown in FIGS. 6 to 9, a support member 41 fitted to the tip of the first rotor arm 33, a stationary shaft 42 whose base end is fixedly coupled the tip of the support member 41, a line roller 43 that is rotatively mounted to the stationary shaft 42 and is capable of guiding fishing line, a stationary shaft cover 44 provided on the tip of the stationary shaft 42, and a fishing line-catching portion 45 that is provided on the tip of the stationary shaft cover 44 and which catches the fishing line.

The support member 41 is fitted on the tip so that it can pivot between a line-winding posture and a line-releasing posture. The stationary shaft 42 is so configured that its base end is locked non-rotatably to the tip of the support member 41, and is fixedly coupled the support member 41 by a mounting bolt 42a. As shown in FIG. 6, the tip of the stationary shaft 42 is slightly inclined toward the spool 4 with respect to the pivoting surface (see FIG. 1) of the support member 41. The line roller 43 is rotatively mounted on to the outer periphery of the stationary shaft 42 via a pair of bearings 46. A ring-shaped guide groove 47 for guiding fishing line is formed on the outer peripheral surface of the line roller 43, and thus line kinks do not easily occur. Both ends of the outer periphery of the line roller 43 are covered by the support member 41 and the stationary shaft cover 44.

The stationary shaft cover 44 is a member made of, for example, a stainless steel alloy and unitarily formed with the stationary shaft 42 as a one-piece unit. The stationary shaft cover 44 is arranged on the tip side of the stationary shaft 42. The vertex 44b of the stationary shaft cover 44 is tilted rearward (downward in FIG. 9) more than the tip 42a of the stationary shaft 42, and the stationary shaft cover 44 is an approximately cone-shaped member that has a fishing line guide surface 44c provided on the reel unit 2 side thereof (lower side of FIG. 9). The region indicated by hatching in FIG. 7 that is near the ridge line of the stationary shaft cover 44 on the rear surface thereof forms the fishing line guide surface 44c that guides fishing line to the line roller 43. As shown in FIG. 6, when the rotor 3 is viewed from the front, the tip of the stationary shaft cover 44 is concentric with the stationary shaft 42 and inclined toward the spool 4. When the fishing line guide portion 31 is in the line-winding posture, the fishing line guide surface 44c is arranged such that the distance between it and the reel unit 2 gradually becomes shorter from the tip side toward the fishing line-catching portion 45 side of the stationary shaft 42. A thumb recess portion 44a that is recessed from the rest of the stationary shaft cover 44 is formed on the front face of the stationary shaft cover 44. This type of thumb recess portion 44a is useful in returning the fishing line guide portion 31 from the line-winding posture to the line-releasing posture. The fishing line-catching portion 45 is formed so that it bulges below the vertex 44b to smoothly continue with its ridge line and protrude outwardly from the vertex 44b, and its fore-end is thicker than the surrounding portions of the fishing line-catching portion 45. The tip of the fishing line-catching portion 45 is rounded into a spherical shape.

With the fishing line guide portion 31 thus configured, the fishing line does not easily come off once it is caught by the fishing line-catching portion 45 because the tip of the fishing line-catching portion 45 is thicker than the surrounding portions of the fishing line-catching portion 45. In addition, because the fishing line-catching portion 45 and the vertex 44b of the stationary shaft cover 44 are tilted rearward, the fishing line caught by the fishing line-catching portion 45 can be reliably guided to the guide groove 47 of the line roller 43 by the line-guiding surface 44c.

Anti-Reverse Mechanism

As shown in FIG. 3, an anti-reverse mechanism 50 can prohibit/permit the rotation of the rotor 3 in the line reel-out direction. The anti-reverse mechanism 50 includes a roller-type one-way clutch 51 fitted to the mechanism support portion 10b of the housing unit 10. The one-way clutch 51 can be switched between a reverse-rotation prohibited state and a reverse-rotation permitted state. The anti-reverse mechanism 50 further includes a switching operation unit 52 for switching the one-way clutch 51 between the reverse-rotation prohibited state and the reverse-rotation permitted state. The switching operation unit 52 is supported pivotably by the operation support portion 10c and the intermediate support portion 10d of the housing unit 10. Anti-reverse mechanisms are well-known components in the art. Therefore, the structure and functions of the anti-reverse mechanism 50 will not be described in further detail herein.

Spool

The spool 4 can be mounted in a plurality of rotational phases with respect to the spool shaft 16, and the length at which the tackle hangs can be changed. The spool 4 has, as shown in FIG. 3, a shallow-channel contour, and includes a bobbin 4a around the outer periphery of which fishing line is wound, a cylindrical skirt portion 4b formed on the rear end of the bobbin 4a so as to have a larger diameter than the bobbin 4a, and a front flange portion 4c formed on the front end of the bobbin 4a so as to have a slightly larger diameter than the bobbin 4a.

The bobbin 4a is non-rotatable relative to the spool shaft 16, and is arranged on the outer peripheral side of the support portion 32 and the line-entanglement prevention member 35 of the rotor 3. The bobbin 4a includes a front wall portion 4d formed integrally with the tip side of the inner periphery of the bobbin 4a, and a boss portion 4e formed integrally with the inner peripheral side of the front wall portion 4d so as to protrude rearward. The front wall portion 4d has a number of perforations 4g formed therein that serve to reduce weight.

As shown in FIG. 1, the skirt portion 4b has a number of perforations 4f having varied inner diameters formed therein that serve to reduce weight. The front flange portion 4c has an expanding outer peripheral surface that slightly increases in diameter from the outer peripheral surface of the bobbin 4a toward the front. This greatly reduces the release resistance that acts on fishing line when casting.

Operation of Spinning Reel

Next, handling and operation of the spinning reel will be described.

It should be noted that the description of the handling pertains to a situation in which casting is performed with the right hand. When casting, the fishing line guide portion 31 is put in the line-winding posture to hook the fishing line on the fishing line guide portion 31, and the hanging length of the tackle is then adjusted.

First, the handle 1 is rotated in the line reel-in direction so that the fishing line guide portion 31 is in a predetermined rotational phase in which the spool 4 is disposed near the end of its stroke. Specifically, when casting with the right hand, for example, the fishing line guide portion 31 can be easily operated with the left hand when the fishing line guide portion 31 is on the left of the spool 4 as viewed from the rod side, in view of the operability of the fishing line guide portion 31 and the ease of picking up the fishing line.

In this state, with the fingertip of the left hand (the hand not holding the fishing rod), the stationary shaft cover 44 of the fishing line guide portion 31 is grasped to flip the fishing line guide portion 31 over to the line-releasing posture. When this is done, because the thumb recess portion 44a is formed on the stationary shaft cover 44, the stationary shaft cover 44 can be easily grasped and the fishing line guide portion 31 can be grasped and easily pivoted. Then, fishing line wound on the spool 4 is grasped with the left hand, and the fishing rod is cast with the index finger of the right hand hooking the fishing line.

After casting, the fishing line guide portion 31 is pivoted back from the line-releasing posture to the line-winding posture with the left hand, and the fishing line is grasped with the left hand to place it in the fishing line-catching portion 45 of the fishing line guide portion 31. The fishing line caught with the fishing line-catching portion 45 is guided through the fishing line guide surface 44c of the stationary shaft cover 44 to the guide groove 47 of the line roller 43. The handle 1 is slightly rotated in the line reel-in direction in this state to apply slight tension to the fishing line, and the rod is set aside.

When the fishing line is caught, because the tip of the fishing line-catch portion 45 is thicker than the surrounding portions of the fishing line-catch portion 45, it will be difficult for the fishing line caught by the fishing line-catch portion 45 to slip off from the thick tip, and thus there will no longer be a need to provide other structure to prevent the fishing line from slipping off. Because of this, it will be easy for the fishing line to be caught on the fishing line-catch portion 45, and the fishing line can be prevented from falling off with a simple structure. In addition, because the stationary shaft cover 44 is formed into an approximate cone-shape in which the vertex 44b thereof is tilted rearward, the tip side of the fishing line guide surface 44c can be positioned closer to the reel unit 2 than the base end side, which continues to the ridge line. Thus the fishing line guided by the fishing line guide surface 44c will be guided by the line roller 43. Because of this, by simply catching the fishing line on the fishing line-catching portion 45, the fishing line will be easily guided to the line roller 43 via the fishing line guide surface 44c and it will be difficult for the guided fishing line to fall of from the fishing line guide surface 44c. Thus, the fishing line can be easily caught, and the fishing line can be prevented from coming off from the line roller 43 with a simple structure.

When a fish is caught on the tackle and the handle 1 is rotated, the rotor 3 rotates in the line reel-in direction and the spool 4 is moved back and forth. At the same time, the rotation of the handle 1 is transmitted to the master gear 7 via the shaft 7a, rotating the rotor 3 through the pinion gear 9. In addition, the oscillating mechanism 6 is operated with the pinion gear 9 via the gear-down train 20, moving the spool 4 back and forth.

At this point, because the first rotor arm 33 and the second rotor arm 34 are disposed opposite to each other on either side of the rotational axis X, rotational balance can be more favorably maintained even if the fishing line guide portion 31 is disposed in a position that is tilted outward with respect to the rotational axis X. Moreover, the rotational balance is more accurately corrected because the balance correcting weight members 38, 39 are mounted in the second rotor arm 34 and the line-entanglement prevention member 35.

With this master gear 7, the annular portion 7c is made of a stainless steel alloy and mounted on the outer periphery of the end portions of the shaft 7a which is made of an aluminum alloy. Because of this, distension of the end portions of the shaft 7a in the radially outward direction can be reduced due to the annular portions 7c mounted thereto, even if the tip of the handle shaft 1a is screwed onto the shaft 7a. Thus, because it will be difficult for the end portions of the shaft 7a to become distended in the radially outward direction, the bearings 15a, 15b can be easily removed.

Alternative Embodiments

Master gears in accordance with alternative embodiments will now be explained. In view of the similarity between the embodiments, the parts of the alternative embodiments that are identical to the parts of the first embodiment will be given the same reference numerals as the parts of the first embodiment. Moreover, the descriptions of the parts of the alternative embodiments that are identical to the parts of the first embodiment may be omitted for the sake of brevity. The parts of the alternative embodiments that differ from the parts of the first embodiment will be indicated with an apostrophe (') or a double prime (").

(a) In the aforementioned embodiment, the spinning reel was of a bail-less type, but the spinning reel may also include a bail between the first rotor arm and the second rotor arm.

(b) In the aforementioned embodiment, the shaft 7a is made of an aluminum alloy, but is not limited thereto. The shaft 7a may also be made of a lightweight metal such as a magnesium alloy or the like.

(c) In the aforementioned embodiment, the annular portion 7c is made of a stainless steel alloy, but may also be made of a hard metal other than stainless steel alloy. In addition, the annular portion 7c is adhered to the shaft 7a in the aforementioned embodiment, but the annular portion 7c may be fixedly attached to the shaft 7a by any other means.

Figure 12:
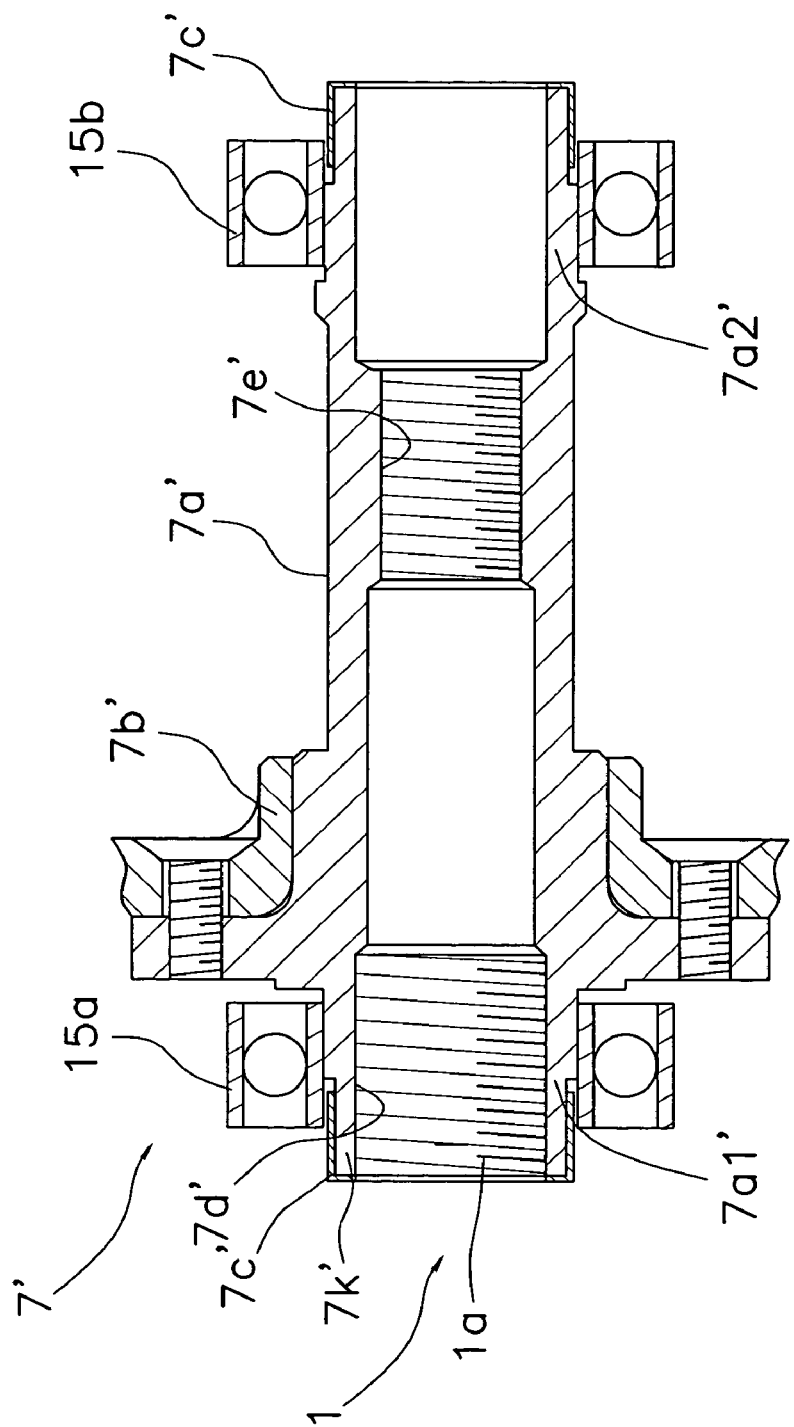
FIG. 12 is a cross-sectional view of a master gear of the spinning reel in accordance with another embodiment of the present invention.

(d) In the aforementioned embodiment, the master gear 7 is integrally formed with the shaft 7a and the gear portion 7b, but as shown in FIG. 12, the master gear 7' may have the shaft 7a' that is formed separately from the gear portion 7b'. In addition, the screw direction of the female threaded portions 7d', 7e' of the shaft 7a' can be formed in either direction.

Figure 13:
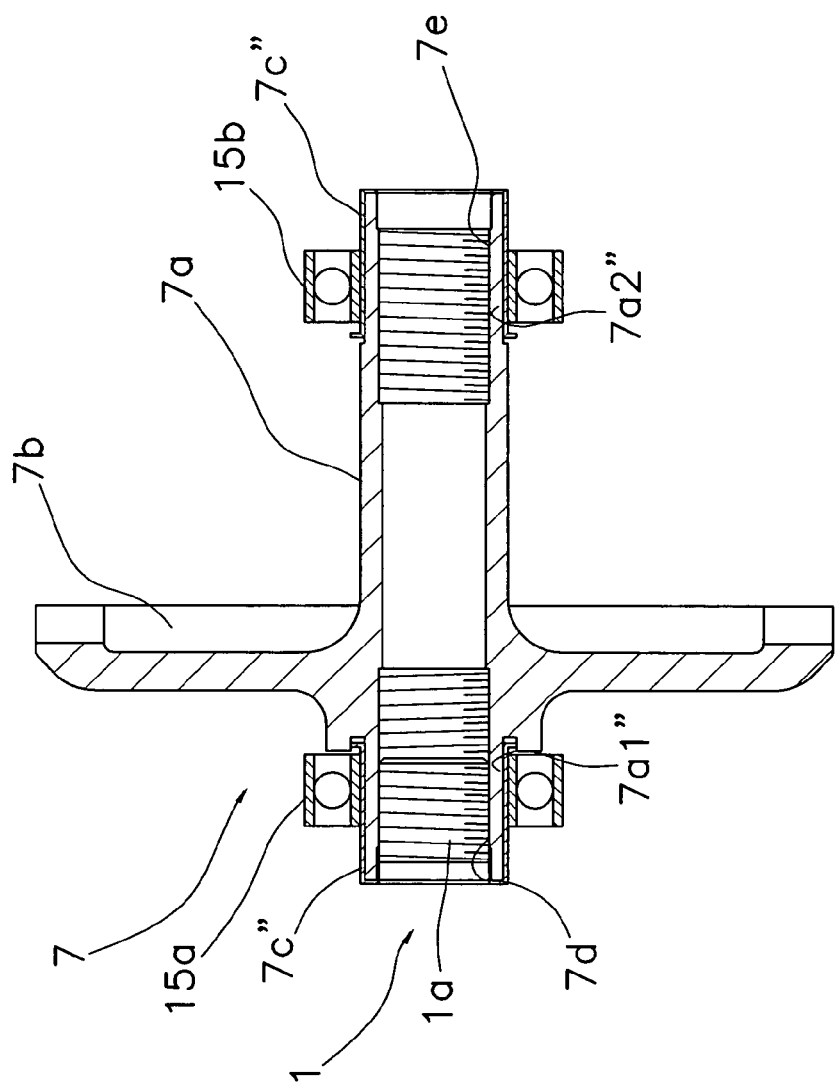
FIG. 13 is a cross-sectional view of a master gear of the spinning reel in accordance with still another embodiment of the present invention.
Figure 14:
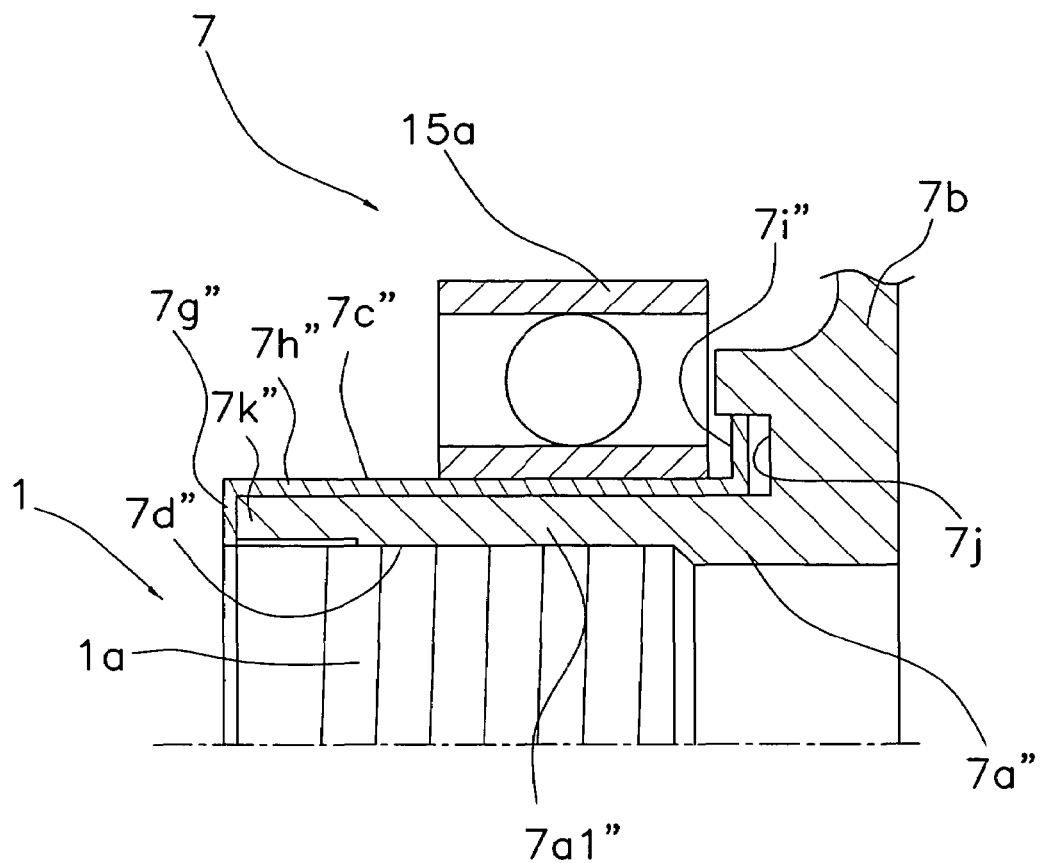
FIG. 14 is an enlarged cross-sectional view of an end portion of the master gear of the spinning reel in accordance with the embodiment of FIG. 13 of the present invention.

(e) In the aforementioned embodiment, the annular portion 7c is mounted on the outer peripheral end portions of the shaft 7a on the outer side of the bearings 15a, 15b. However, as shown in FIGS. 13 and 14, the annular portions 7c" may extend on the outer peripheral surface of the shaft 7a" from the outer side (left hand side in FIG. 14) of the bearings 15a, 15b to the inner side (right hand side in FIG. 14) through the rotational support portion 7a1", such that the outer periphery of the annular portions 7c" supports the bearings 15a, 15b. In addition, as shown in FIG. 14, the annular portion 7c" may include an inner flange portion 7g" that is bent toward the inner side of the shaft 7a" such that it comes into contact with the axial end portion of the shaft 7a", a tubular portion 7h" that is disposed on the outer peripheral portion of the end portion of the shaft 7a" and extends from the inner flange portion 7g" toward the gear portion 7b, and an outer flange portion 7i" in which the end portion of the tubular portion 7h" on the gear portion 7b side is bent outward. The outer flange portion 7i" is accommodated in a gap opened in a groove 7j that is formed in an annular shape in the base end of the gear portion 7b. Thus, the annular portion 7c" can prevent compression and distension. Here, the outer flange portion 7i" will be engaged with the bearings 15a, 15b even if the adhesive between the annular portion 7c" and the shaft 7a peels off, and thus the annular portion 7c" can be prevented from falling off of the shaft 7a.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-134901 and 2003-287256. The entire disclosure of Japanese Patent Applications Nos. 2003-134901 and 2003-287256 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A master gear for a spinning reel for transmitting rotation of a screw-in type handle to a rotor via a pinion gear, the master gear being rotatively supported on a reel unit of the spinning reel, the master gear comprising:
   a shaft portion made of a first lightweight metal that is rotatively supported by the reel unit at a rotational support portion, said shaft portion having female threaded portions on its ends such that the handle is adapted to be screwed to one of the female threaded portions;
   a gear portion that is arranged on an outer periphery of the shaft portion, the gear portion being adapted to mesh with the pinion gear; and
   an annular member that is made of a second metal that is harder than the first lightweight metal from which the shaft portion is made, the annular member being mounted on the outer periphery of the shaft portion such that at least part of the annular member is disposed between the rotational support portion and an end of the shaft portion.

2. The master gear for a spinning reel according to claim 1, wherein
   the shaft portion is a tubular member to an inner periphery of which the handle is adapted to be rotatively mounted.

3. The master gear for a spinning reel according to claim 1, wherein
   the shaft portion is made of an aluminum alloy.

4. The master gear for a spinning reel according to claim 1, wherein
   the shaft portion is made of a magnesium alloy.

5. The master gear for a spinning reel according to claim 1, wherein
   the annular member is made of a stainless steel alloy.

6. The master gear for a spinning reel according to claim 1, wherein
   a liquid or gel-type filler made of an insulating material is filled between the shaft portion and the annular member.

7. The master gear for a spinning reel according to claim 1, wherein
   the gear portion is integrally formed with the shaft portion as a one-piece unitary unit.

8. The master gear for a spinning reel according to claim 1, wherein
   the gear portion is formed separately from the shaft portion.

9. The master gear for a spinning reel according to claim 1, wherein
   the annular member includes a tubular portion disposed on the outer periphery of the shaft portion extending toward the gear portion, and an inner flange portion that is bent inward from an axial end of the tubular portion.

10. The master gear for a spinning reel according to claim 9, wherein
    the tubular portion is mounted on the outer periphery of the shaft portion such that at least part of the tubular portion is between the rotational support portion and the end of the shaft portion.

11. The master gear for a spinning reel according to claim 9, wherein
    the tubular portion is mounted on the outer periphery of the shaft portion extending through the rotational support portion.

12. The master gear for a spinning reel according to claim 11, wherein
    the annular member further includes an outer flange portion which is bent outward from a gear portion side axial end of the tubular portion.

13. A spinning reel comprising:
    a reel unit having a handle;
    a rotor on a front of the reel unit;
    a spool mounted on a front of the rotor so as to move forward and rearward; and
    a rotor drive mechanism accommodated within the reel unit and including a master gear rotatably supported on the reel unit and including
- a shaft portion made of a first lightweight metal that is rotatively supported by the reel unit at a rotational support portion, said shaft portion having female threaded portions on its ends such that the handle is screwed to one of the female threaded portions,
- a gear portion that is arranged on an outer periphery of the shaft portion, and
- an annular member that is made of a second metal that is harder than the first lightweight metal from which the shaft portion is made, the annular member being mounted on the outer periphery of the shaft portion such that at least part of the annular member is disposed between the rotational support portion and an end of the shaft portion, and a pinion gear rotatably supported to the reel unit and fixedly coupled to the rotor, the pinion gear meshing with the gear portion of the master gear.

14. The spinning reel according to claim 13, wherein the shaft portion is a tubular member to an inner periphery of which the handle is adapted to be rotatively mounted.

15. The spinning reel according to claim 13, wherein the shaft portion is made of an aluminum alloy.

16. The spinning reel according to claim 13, wherein the shaft portion is made of a magnesium alloy.

17. The spinning reel according to claim 13, wherein the annular member is made of a stainless steel alloy.

18. The spinning reel according to claim 13, wherein a liquid or gel-type filler made of an insulating material is filled between the shaft portion and the annular member.

19. The spinning reel according to claim 13, wherein the gear portion is integrally formed with the shaft portion as a one-piece unitary unit.

20. The spinning reel according to claim 13, wherein the gear portion is formed separately from the shaft portion.

21. The spinning reel according to claim 13, wherein the annular member includes a tubular portion disposed on the outer periphery of the shaft portion extending toward the gear portion, and an inner flange portion that is bent inward from an axial end of the tubular portion.

22. The spinning reel according to claim 21, wherein the tubular portion is mounted on the outer periphery of the shaft portion such that at least part of the tubular portion is between the rotational support portion and the end of the shaft portion.

23. The spinning reel according to claim 21, wherein the tubular portion is mounted on the outer periphery of the shaft portion extending through the rotational support portion.

24. The spinning reel according to claim 23, wherein the annular member further includes an outer flange portion which is bent outward from a gear portion side axial end of the tubular portion.

* * * * *